United States Patent
Bender et al.

(10) Patent No.: US 11,118,931 B2
(45) Date of Patent: Sep. 14, 2021

(54) ENHANCED ENDPOINT DIRECTIONS IN A MAPPING PROGRAM

(71) Applicant: International Business Machines Corporation, Armonk, NY (US)

(72) Inventors: Michael Bender, Rye Brook, NY (US); Gregory J. Boss, Saginaw, MI (US); Martin G. Keen, Cary, NC (US); Natalie Brooks Powell, Bolingbrook, IL (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 16/202,725

(22) Filed: Nov. 28, 2018

(65) Prior Publication Data
US 2020/0166367 A1    May 28, 2020

(51) Int. Cl.
*G01C 21/36* (2006.01)
*G06F 16/438* (2019.01)
(Continued)

(52) U.S. Cl.
CPC ..... *G01C 21/3647* (2013.01); *G01C 21/3484* (2013.01); *G01C 21/3626* (2013.01);
(Continued)

(58) Field of Classification Search
CPC ............ G01C 21/3647; G01C 21/3641; G01C 21/3484; G01C 21/3626; G06K 9/00677;
(Continued)

(56) References Cited

U.S. PATENT DOCUMENTS

| | | | |
|---|---|---|---|
| 6,351,710 B1 * | 2/2002 | Mays ................. | G01C 21/3647 701/533 |
| 7,865,306 B2 * | 1/2011 | Mays ................. | G01C 21/3647 701/437 |
| 8,825,404 B2 | 9/2014 | Mays | |
| 8,924,149 B2 * | 12/2014 | Coppens ............... | G01C 21/32 701/438 |
| 9,400,186 B1 * | 7/2016 | Bank et al. ........ | G01C 21/3484 |

(Continued)

OTHER PUBLICATIONS

"Google Street View on the App Store", Copyright © 2018 Apple Inc., printed on Aug. 17, 2018, 5 pps., https://itunes.apple.com/us/app/google-street-view/id904418768?mt=8.

*Primary Examiner* — Dale W Hilgendorf
(74) *Attorney, Agent, or Firm* — Marcus Walker (57) ABSTRACT

Aspects of the present invention disclose a method for improved directional information. The method includes one or more processors identifying one or more images of a location corresponding to a destination of a set of navigational instructions. The method further includes determining respective ratings for the identified one or more images based on crowd sourced ratings of the identified one or more images from individuals that have previously travelled to the destination. The method further includes determining an entrance location for the destination based on the crowd sourced ratings of the identified one or more images. The method further includes determining at least one image, of the one or more images, that depicts the determined entrance location. The method further includes generating directional information to the entrance location by overlaying directional information on the determined at least one image that provides an indication of the determined entrance location.

17 Claims, 3 Drawing Sheets

(51) Int. Cl.
  *G06K 9/00* (2006.01)
  *G06K 9/62* (2006.01)
  *G06F 16/909* (2019.01)
  *G01C 21/34* (2006.01)
  *G06F 16/487* (2019.01)

(52) U.S. Cl.
  CPC ....... *G01C 21/3641* (2013.01); *G06F 16/438* (2019.01); *G06F 16/487* (2019.01); *G06F 16/909* (2019.01); *G06K 9/00624* (2013.01); *G06K 9/00637* (2013.01); *G06K 9/00677* (2013.01); *G06K 9/6202* (2013.01)

(58) Field of Classification Search
  CPC ........... G06K 9/00637; G06K 9/00624; G06K 9/6202; G06F 16/487; G06F 16/438; G06F 16/909
  See application file for complete search history.

(56) References Cited

U.S. PATENT DOCUMENTS

| | | | |
|---|---|---|---|
| 9,976,864 B2* | 5/2018 | Kahn et al. | G01C 21/3484 |
| 10,198,456 B1* | 2/2019 | Boyer et al. | G06K 9/00637 |
| 10,586,365 B2* | 3/2020 | Chang et al. | G01C 21/3647 |
| 2009/0187337 A1 | 7/2009 | Denk, Jr. | |
| 2009/0198442 A1* | 8/2009 | Takagi | G01C 21/3647 701/533 |
| 2011/0238290 A1* | 9/2011 | Feng et al. | G01C 21/3647 701/533 |
| 2011/0313653 A1* | 12/2011 | Lindner | G01C 21/3647 701/523 |
| 2012/0059720 A1* | 3/2012 | Musabji et al. | G01C 21/3647 701/527 |
| 2014/0244159 A1 | 8/2014 | Musabji | |
| 2015/0168150 A1* | 6/2015 | Kahn et al. | G01C 1/3484 701/538 |
| 2018/0336728 A1* | 11/2018 | Edwards | G01C 21/3626 |

* cited by examiner

ENHANCED ENDPOINT DIRECTIONS IN A MAPPING PROGRAM

BACKGROUND OF THE INVENTION

The present invention relates generally to the field of location services and more particularly to endpoint directions.

In recent years, developments in mapping programs have become efficient in providing directions to users. Many mapping programs provide users with only an arrival notification. While some mapping programs provide users with a panoramic view of destinations to aid in the process of providing directions to users.

Metadata is "data about data" and includes two different types of metadata, structural metadata, and descriptive metadata. Structural metadata includes information about the design and specification of data structures (i.e., data about the containers of data). Descriptive metadata includes information about individual instances of application data or the data content. Metadata can be written into a digital image file to indicate various types of information that is associated with the image, such as who owns the image, copyright and contact information, what camera created the image file, along with exposure information and descriptive information, such as keywords associated with the image. Images that include metadata can be more easily searchable (e.g., via the Internet). Metadata also helps organize electronic resources, provides digital identification, and helps support archiving and preservation of a resource. Metadata also assists in resource discovery by allowing resources to be found (e.g., via Internet searching) by relevant criteria, identifying resources, associating similar resources, and giving location information.

SUMMARY

Aspects of the present invention disclose a method, computer program product, and system for extending directional information provided by mapping/direction software upon a user reaching a known location. The method includes identifying, by one or more processors, one or more images of a location corresponding to a destination of a set of navigational instructions for a user. The method further includes determining, by one or more processors, respective ratings for the identified one or more images based on crowd sourced ratings of the identified one or more images from individuals that have previously travelled to the destination. The method further includes determining, by one or more processors, an entrance location for the destination based on the crowd sourced ratings of the identified one or more images. The method further includes determining, by one or more processors, at least one image, of the one or more images, that depicts the determined entrance location. The method further includes generating, by one or more processors, directional information to the entrance location by overlaying directional information on the determined at least one image that provides an indication of the determined entrance location.

DETAILED DESCRIPTION

Figure 2:
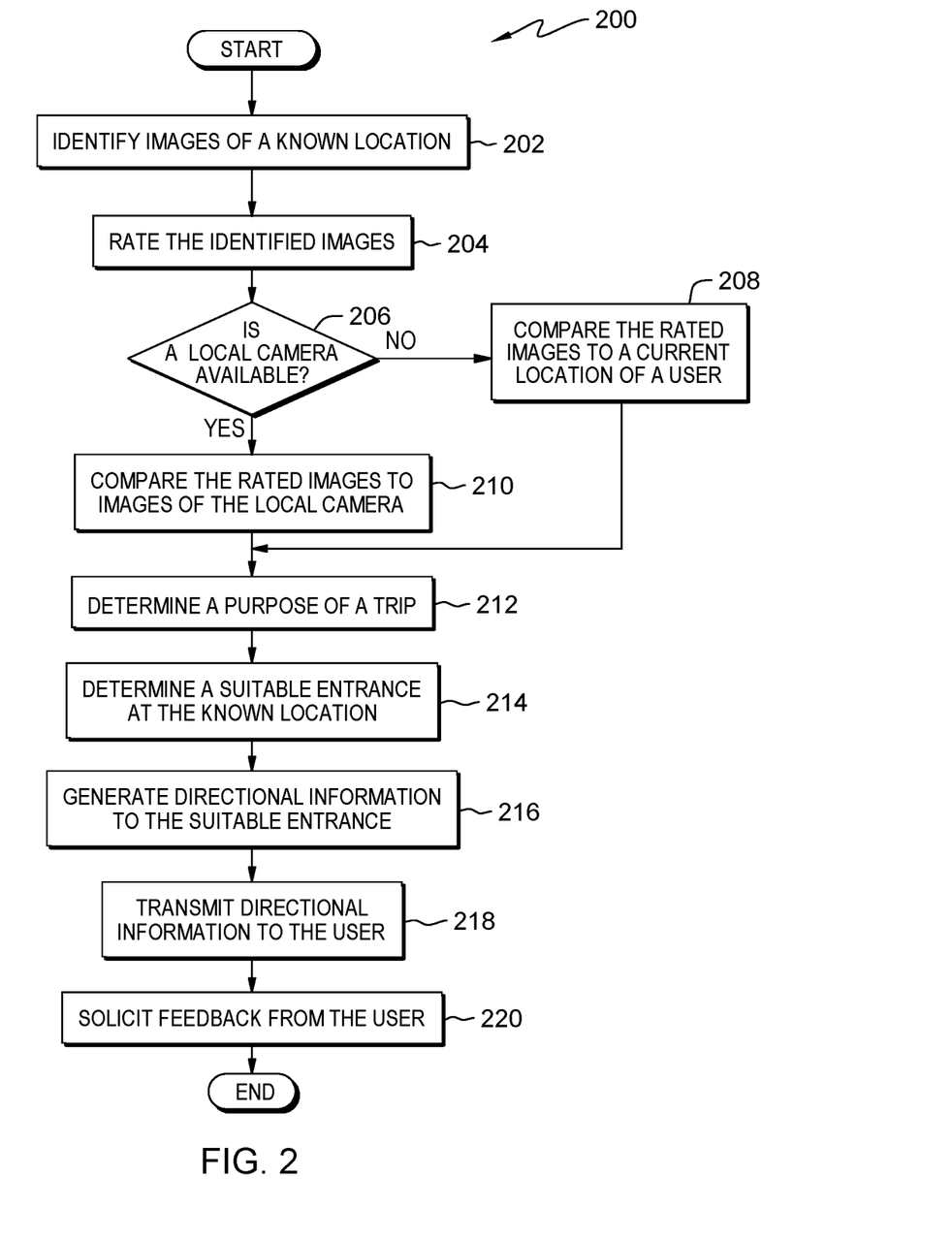
FIG. 2 is a flowchart depicting operational steps of a program for extending directional information provided by mapping/direction software upon a user reaching a known location.

Embodiments of the present invention allow for providing improved directional information to a user upon arrival at a known location. Embodiments of the present invention identify images of a known location, rate the identified images of the known location, and compare the rated images to a location of a user or images of a local camera. The rated image is analyzed with a determined purpose of a trip of the user to determine a suitable entrance of the known location. The additional directional information of the suitable entrance of the known location are delivered to the user. Additional embodiments of the present invention solicit feedback for the trip and the provided directional information. In accordance with various embodiments of the present invention, a suitable entrance refers to entry points of a known location, which are desired or preferred entry points for a user based on a determined trip purpose of the user, that mapping program 200 identifies. In various embodiments, an entrance is suitable when the entrance is appropriate for the purpose of a trip of the user. For example, mapping program 200 determines that a user is visiting a shopping center to have a car of the user serviced, and directs the user to a rear entrance (e.g., a car service entrance) of the shopping center. In alternate embodiments, an entrance is suitable when a person, which previously visited the location and has a matching trip purpose as a user, verifies the entrance. For example, mapping program 200 utilizes an employee entrance used by a person who visited a shopping center to interview (e.g., purpose) for a job, and determines that the employee entrance is suitable another interviewee. Generally, a suitable entrance is an entrance in which the location would desire the user to enter based on the purpose of the visit, or is the easiest access point for the user based on the current location of the user.

Some embodiments of the present invention recognize that directions provided by navigational programs utilizing street addresses are not always sufficient to direct a user to a destination. For example, a final destination of navigational directions given may bring a user to the back of a building. Various embodiments of the present invention improve the efficiency of the navigational programs by utilizing cognitive analysis, visual recognition, and crowdsourcing to deliver enhanced navigational directions to a user upon arrival to a street address. Thus, the present invention enhances navigational programs by improving the accuracy of navigational directions provided to a user through supplying navigational directions that extend closer to a true final destination of the user.

Embodiments of the present invention recognize that the present invention reduces the amount of processing resources utilized to generate and deliver navigational information by analyzing data in the background with a reduction in interaction needed from a user. Some embodiments of the present invention reduce the amount of network resources utilized to transmit navigational information. For example, instead of communicating continuously to deliver directions to a user, the present invention delivers packets of data corresponding to a bundle of marked images that reduce the amount of bandwidth utilized by the program. Additionally, embodiments of the present invention increase the amount of network and processing resources available in a system.

Various embodiments of the present invention improve the accuracy of the navigational programs by utilizing crowd sourced data. Some embodiments of the present invention automatically update data used to generate directional information. Thus, the present invention can update images and generate directional information used in near real-time based on based on the crowd sourced data. Embodiments of the present invention can utilize local cameras to update data used in the generation of directional information, which provides the system the most recent information to utilize.

Implementation of embodiments of the invention may take a variety of forms, and exemplary implementation details are discussed subsequently with reference to the Figures.

Figure 1:
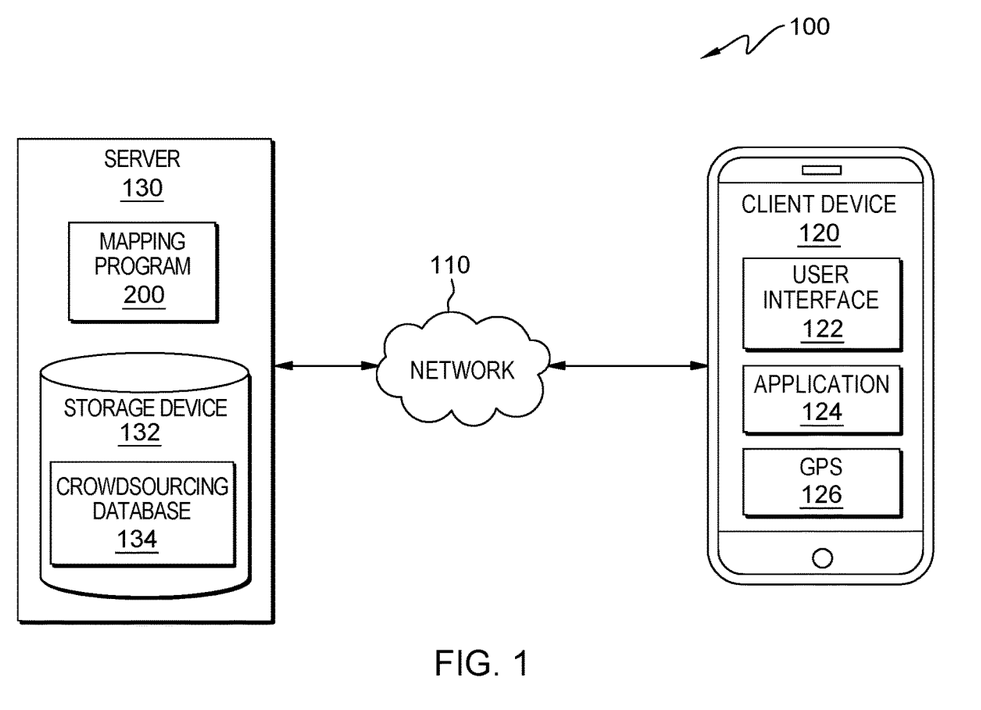
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 120 and server 130, all interconnected over network 110. In one embodiment, client device 120 and server 130 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120 and server 130, in accordance with embodiments of the present invention.

In various embodiments of the present invention, client device 120 may be a workstation, personal computer, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 3, in accordance with embodiments of the present invention.

Client device 120 includes user interface 122, application 124, and Global Positioning System (GPS) 126. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to access directional information of mapping program 200. For example, application 124 is a navigation application that a user utilizes to receive directions to a destination. In another embodiment, a user utilizes application 124 of client device 120 to provide mapping program 200 with directional information (e.g., based on past user usage of mapping program 200). For example, application 124 is a web browser that a user utilizes to answer survey questions about directions to a destination the user received.

GPS 126 is a global navigation system that provides geolocation information of an object. In one embodiment, GPS 126 provides geolocation information of client device 120 to mapping program 200. For example, mapping program 200 accesses GPS 126 of a mobile device of a user to determine whether the user has arrived at a known location. In another example, mapping program 200 accesses GPS 126 of a mobile device of a user to locate local cameras that include images of a known location.

In various embodiments of the present invention, server 130 may be a desktop computer, a computer server, or any other computer systems, known in the art. In certain embodiments, server 130 represents computer systems utilizing clustered computers and components (e.g., database server computers, application server computers, etc.), which act as a single pool of seamless resources when accessed by elements of data processing environment 100. In general, server 130 is representative of any electronic device or combination of electronic devices capable of executing computer readable program instructions. Server 130 may include components as depicted and described in further detail with respect to FIG. 3, in accordance with embodiments of the present invention.

Server 130 includes storage device 132, crowdsourcing database 134, and mapping program 200. Storage device 132 can be implemented with any type of storage device, for example, persistent storage 305, which is capable of storing data that may be accessed and utilized by client device 120 and server 130, such as a database server, a hard disk drive, or a flash memory. Storage device 132 stores numerous types of data which may include a database or repository. Crowdsourcing database 134 is an organized collection of data (e.g., image, audio, and/or video data) corresponding to known locations provided by users of mapping program 200 and/or accessed via network 110.

In one embodiment, crowdsourcing database 134 stores data that mapping program 200 transmits. For example, crowdsourcing database 134 stores data (e.g., a location of an entrance, a purpose of a trip, a current location of a user, etc.) that a user may utilize when applying a tag to an image. In another example, crowdsourcing database 134 stores a plurality of images of an office building (e.g., a known location) from various vantage points. In another example, crowdsourcing database 134 stores the number of times users of mapping program 200 utilized an image. In another example, crowdsourcing database 134 stores a rating of an image (e.g., a score) of an office building a user of mapping program 200 assigns the image. In yet another example, crowdsourcing database 134 stores a directional information (e.g., a GPS location, route, etc.) of a user that corresponds to a purpose of a trip of the user.

In additional embodiments, data processing environment 100 can include additional servers (not shown) that host additional images that are accessible to mapping program 200 via network 110. Mapping program 200 identifies images of a known location, rates the identified images, and compares the rated images to a subset of images. Additionally, mapping program 200 determines a suitable entrance of the known location based on the purpose of a trip, and transmits directional information corresponding to the known location. In another embodiment, mapping program 200 transmits a request for feedback from client device 120. For example, mapping program 200 sends a survey to a user of a mobile device, which mapping program 200 stores in crowdsourcing database 134.

FIG. 2 is a flowchart depicting operational steps of mapping program 200, a program for extending directional information provided by mapping/direction software upon a user reaching a known location. In one embodiment, mapping program 200 initiates in response to determining that a user is within a defined proximity to a known location (e.g., a destination a user inputs into GPS navigational software). For example, mapping program 200 monitors a location of a user, compares the location of the user to a known location (e.g., a destination of a user, a threshold distance to a destination, etc.) to determine whether the user has arrived at the known location. In another example, mapping program 200 monitors a navigational application of a mobile device of a user to determine whether a trip of the user is complete. In another embodiment, mapping program 200 initiates in response to receiving a request for a set of navigational instructions to a specified destination.

In step 202, mapping program 200 identifies images of a known location. In accordance with various embodiments of the present invention, a known location refers to a geolocation of a destination of a user (e.g., an address, building, street corner, etc.). In one embodiment, mapping program 200 identifies images, stored within crowdsourcing database 134, which correspond to a known location. For example, mapping program 200 identifies images of an office building in crowdsourcing database 134 that previous users that visited the office building contributed or used. In another embodiment, mapping program 200 utilizes network 110 to access a remote server to identify images that correspond to a known location. For example, mapping program 200 identifies an image of an office building hosted on a website that includes a geolocation in the metadata of the image that matches the geolocation of an address a user enters into a navigational application. In various embodiments, an individual utilizing client device 120 provides input that specifies a destination in a navigational program (e.g., application 124) and mapping program 200 utilizes the input destination to identify the known location.

In step 204, mapping program 200 rates the identified images. In one embodiment, mapping program 200 groups identified images of crowdsourcing database 134 together based on a vantage point of a known location. For example, mapping program 200 bundles together images with similar vantage point angles of a north entrance of an office building, and bundles together images with similar vantage point angles of a south entrance of the office building. In another embodiment, mapping program 200 utilizes crowdsourcing database 134 to determine a score of an identified image based on a crowd source rating and frequency of use. For example, mapping program 200 can assign an image a value of zero (0) to one-hundred (100) that is proportional to a crowd source rating of the image. In another example, mapping program 200 can assign each image of a bundle a value of zero (0) to one-hundred (100) that is proportional to a crowd source rating of each image of the bundle. In another example, mapping program 200 can assign an image a value of zero (0) to one-hundred (100) that is proportional to a percentage, which is the number of times the image is used out of a total number of times all images corresponding to a north entrance of an office building are used. In yet another example, mapping program 200 can assign an image a value of zero (0) to one-hundred (100) that is based on combined weights of a crowd source rating and frequency of use value. In another embodiment, mapping program 200 ranks identified images based on a determined score. For example, mapping program 200 ranks identified images from highest to lowest based on a value assigned to an image.

In decision step 206, mapping program 200 determines whether a local camera is available. In one embodiment, mapping program 200 utilizes network 110 to detect a camera proximate to a current location of a user. For example, mapping program 200 utilizes a wireless local access network (WLAN) and a corresponding location of a user (e.g., utilizing GPS 126) to detect a camera that is proximate to the user (e.g., a mobile device, automobile camera, traffic camera, etc.) and is accessible to mapping program 200. In another example, mapping program 200 utilizes reverse image searching techniques to identify images taken by a public camera, which captures a known location, and analyzes metadata of the identified images to determine a location of the public camera.

In various embodiments, mapping program 200 can access a listing of cameras and camera-enabled devices that are registered with a navigational service of mapping program 200 (i.e., have opted-in to providing information to mapping program 200) to determine whether a local camera is proximate to the user. In example embodiments, individuals can register a camera with mapping program 200 (e.g., a camera owner permits mapping program 200 to access and utilize a video feed and images from a camera) and/or register a location with mapping program 200 (e.g., a business owner permits mapping program 200 to utilize a video feed and images of a particular location). Accordingly, mapping program 200 can whether a local camera is available (decision step 206) utilizing an approved listing a cameras and locations.

In additional embodiments, mapping program can prompt an individual associated with a local camera to determine whether the individual authorizes mapping program 200 to access and utilize the local camera. For example, mapping program 200 determines that client device 120 includes an available camera and mapping program 200 sends a prompt to an individual utilizing client device 120, requesting approval to access and utilize a video feed of the camera.

If mapping program 200 determines that a local camera is not available (decision step 206, no branch), then mapping program 200 proceeds to step 208 to compare the rated images to a current location of a user. For example, mapping program 200 determines that a local camera is not available, then mapping program 200 compares a geolocation of rated images to a current location of a user (e.g., office building north entrance) until mapping program 200 identifies a suitable rated image (e.g., an image within a defined proximity to a determined geolocation of client device 120, an image with a highest associated rating that is within a defined proximity to the user, etc.). In another example, a user can confirm or disapprove of a rated image (e.g., via input into user interface 122). In another embodiment, if mapping program 200 determines that a local camera is available (decision step 206, yes branch), then mapping program 200 proceeds to step 210 to compare the rated images to images of the local camera.

In step 208, mapping program 200 compares the rated images to a current location of a user. In one embodiment, mapping program 200 compares the geolocation of the rated images of crowdsourcing database 134 to the current location of a user. For example, mapping program 200 utilizes descriptive metadata of the rated images to determine a geolocation corresponding to where the rated image was created and compare the geolocation of the rated image to the geolocation of the user. In another example, mapping program 200 compares the geolocation of rated images to a geolocation of a mobile device (e.g., a location derived from GPS 126 of client device 120) of a user. In another embodiment, mapping program 200 utilizes crowdsource data of users (e.g., location tags of previous users) of mapping program 200 to compare a geolocation of the rated images to a geolocation of a destination a user input into application 124 of client device 120. For example, mapping program 200 utilizes geolocation information of crowdsource tags of the rated images to compare to a geolocation of an address a user input into a navigational application (e.g., application 124) on a mobile device (e.g., client device 120).

In yet another embodiment, mapping program 200 utilizes GPS 126 of client device 120 to determine a current location of a user and compares rated images of crowdsourcing database 134 with a geolocation that matches the geolocation of the user. For example, mapping program 200 determines a geolocation of a user and selects an image, which has a geolocation that matches the geolocation of the user, from a server with the highest crowdsource rating for the geolocation of the user.

In step 210, mapping program 200 compares the rated images to images of the local camera. More specifically, responsive to determining that a local camera is available (decision step 206, yes branch), mapping program 200 compares the rated images to images of the local camera. In one embodiment, mapping program 200 compares the rated images of crowdsourcing database 134 to images of the local camera (e.g., client device 120). For example, mapping program 200 compares objects (e.g., building shape, doors, windows, marquees, etc.) of images supplied by users of mapping program 200 (e.g., rated images of crowdsourcing database 134) to objects of images of the office building from a camera of a car of the user (e.g., the local camera). In another example, mapping program 200 determines whether the images from the camera of the car of the user match the rated images of the office building.

In step 212, mapping program 200 determines a purpose of a trip. In one embodiment, mapping program 200 compares a user profile of a user that is stored in storage device 132 to a known location to determine a relationship between the user and the known location. For example, mapping program 200 determines based on a profile of a person that the person is an employee of a company and a human resource department of the company is located in the office building. In this example, mapping program 200 determines that the person is an employee, not a visitor, and that the purpose of the trip is business related with respect to the office building.

In another embodiment, mapping program 200 analyzes communications of a user on application 124 of client device 120 and determines a purpose of a trip of the user to a known location. For example, mapping program 200 analyzes an email in an electronic mail service (e.g., application 124) of a person that has the subject line "Yearly Physical Check-up" with a time and address of the office building in the body of the email. Accordingly, mapping program 200 determines that a purpose of the trip of the person is "medical treatment". In another example, mapping program 200 analyzes the calendar (e.g., application 124) of a mobile device of a person that has an event (e.g., a lunch date) at café in the office building. Accordingly, mapping program 200 determines that the purpose of the trip of the person is "Lunch".

In various embodiments, mapping program 200 determines the purpose of a trip of the user based on an analysis of data sources (e.g., messaging applications, calendars, input commands, input profile information, etc.) that the user has authorized mapping program 200 to utilize. In one scenario, a user of client device 120 authorizes mapping program 200 to utilize all information and data sources that are available for mapping program 200 to access. In another scenario, a user of client device 120 authorizes mapping program 200 to utilize information included in a user profile of the user (e.g., a place of employment, locations of interest, home location, etc.) and a calendar of the user, but does not authorize mapping program 200 to access messages in an email account and messaging account of the user. In this scenario, mapping program 200 determines the purpose of the trip of the user based on an analysis of the authorized user profile and calendar and excludes the email account and messaging account of the user. In an additional embodiment, mapping program 200 can access publicly available information (e.g., a company website that lists addresses of locations, a directory, etc.) to assist in determining the purpose of the trip of the user.

In step 214, mapping program 200 determines a suitable entrance at the known location. In one embodiment, mapping program 200 utilizes data of crowdsourcing database 134 and storage device 132 to determine a route from a current location of a user to the known location. For example, mapping program 200 compares the ratings of crowdsource images, uses the highest crowdsource rated image (i.e., on a scale of 1 to 5 with 5 being the highest possible rating) from a server (e.g., server 130), and retrieves the purpose of the trip from a database of the server (determined in step 212). In this example, determines an entrance to the office building depicted in the rated image for a user based on a comparison of the purpose of the trip with entrances used by previous users of mapping program 200 with a matching purpose.

In another example, mapping program 200 determines from a profile of a user that the user is an employee of a company located in the office building and determines the employee should use a staff entrance based on previous users (e.g., employees) of mapping program 200 with a matching purpose (e.g., employment status). In yet another example, mapping program 200 utilizes a derived purpose of "medical treatment" from an email of a doctor to a person, compares the derived purpose to previous users with a matching purpose, and determines the person should use the visitor's entrance of the office building like the previous users.

In another embodiment, mapping program 200 utilizes an image of an available camera and data of crowdsourcing database 134 to determine a route from a current location of a user to a known location. For example, mapping program 200 may use images from a camera of a car of a user, compare objects from the image of the camera of the car with the highest rated crowdsource image. In this example, mapping program 200 utilizes the results of the image comparison to determine an entrance in the image from the camera of the car that corresponds to an entrance in the highest rated crowdsource image (i.e., a suitable entrance for the user). In another example, mapping program 200 may locate all displayed entrances of the office building using an image from an authorized traffic camera, derive that a person has lunch date (e.g., the purpose determined in step 212) from an event note in the calendar of the person. In this example, mapping program 200 determines that the north entrance is the suitable entrance for the person based on a comparison of entrances used by other patrons of the restaurant in the office building.

In step 216, mapping program 200 generates directional information to the suitable entrance. In one embodiment, mapping program 200 retrieves an image from crowdsourcing database 134 (i.e., an image of a destination of the user that includes the suitable entrance) and generates an overlay on the image, which includes directional information to the suitable entrance at the destination. For example, mapping program 200 retrieves an image of the office building (i.e., an image determined as a result of the comparison in step 208 or step 210) from a server, which corresponds to the current location of the user. In this example, mapping program 200 generates directional information by marking a path to the visitor's entrance based on previous paths taken by users that were also visiting the doctor's office. In another embodiment, mapping program 200 utilizes network 110 to access images of the local camera (determined in decision step 206) and generates an overlay for each image, which includes directional information to the determined suitable entrance. For example, mapping program 200 uses images of the office building from the camera of the car of the user and generates directional information by marking a path to an entrance based on previous paths taken by previous users visiting the café.

In step 218, mapping program 200 transmits the directional information to the user. In one embodiment, mapping program 200 utilizes network 110 to transmit the generated directional information to client device 120. For example, in response to determining that the user is arriving (i.e., within a defined proximity) at the destination, mapping program 200 uses a WAN to communicate directional information to a mobile device of the user. In another embodiment, mapping program 200 initiates display of the image, which includes the overlay of the generated directional information, on client device 120. For example, mapping program 200 displays the image of the office building with a marked path to an entrance (i.e., the determined suitable entrance) on a screen inside the car of the user.

In step 220, mapping program 200 solicits feedback from the user. In one embodiment, mapping program 200 requests information related to the trip from the user. For example, mapping program 200 detects the user is ending the trip on a mobile device of the user and sends a survey to the user. In another example, the survey can include a request to rate the image and the directional information received from mapping program 200. In another example, the survey can include a request to validate the geolocation of the image used to supply directional information and the geolocation of the determined entrance, as well as the purpose of the trip.

In another embodiment, mapping program 200 stores the solicited feedback in crowdsourcing database 134. For example, mapping program takes the information provided by the user (e.g., trip purpose, image tags, image ratings, satisfaction ratings, etc.) and adds the information to a database (e.g., crowdsourcing database 134). In yet another embodiment, mapping program 200 utilizes the solicited feedback to generate ratings for data of crowdsourcing database 134. For example, mapping program 200 uses information provided by users in surveys to update ratings of images and directional information for future users.

Figure 3:
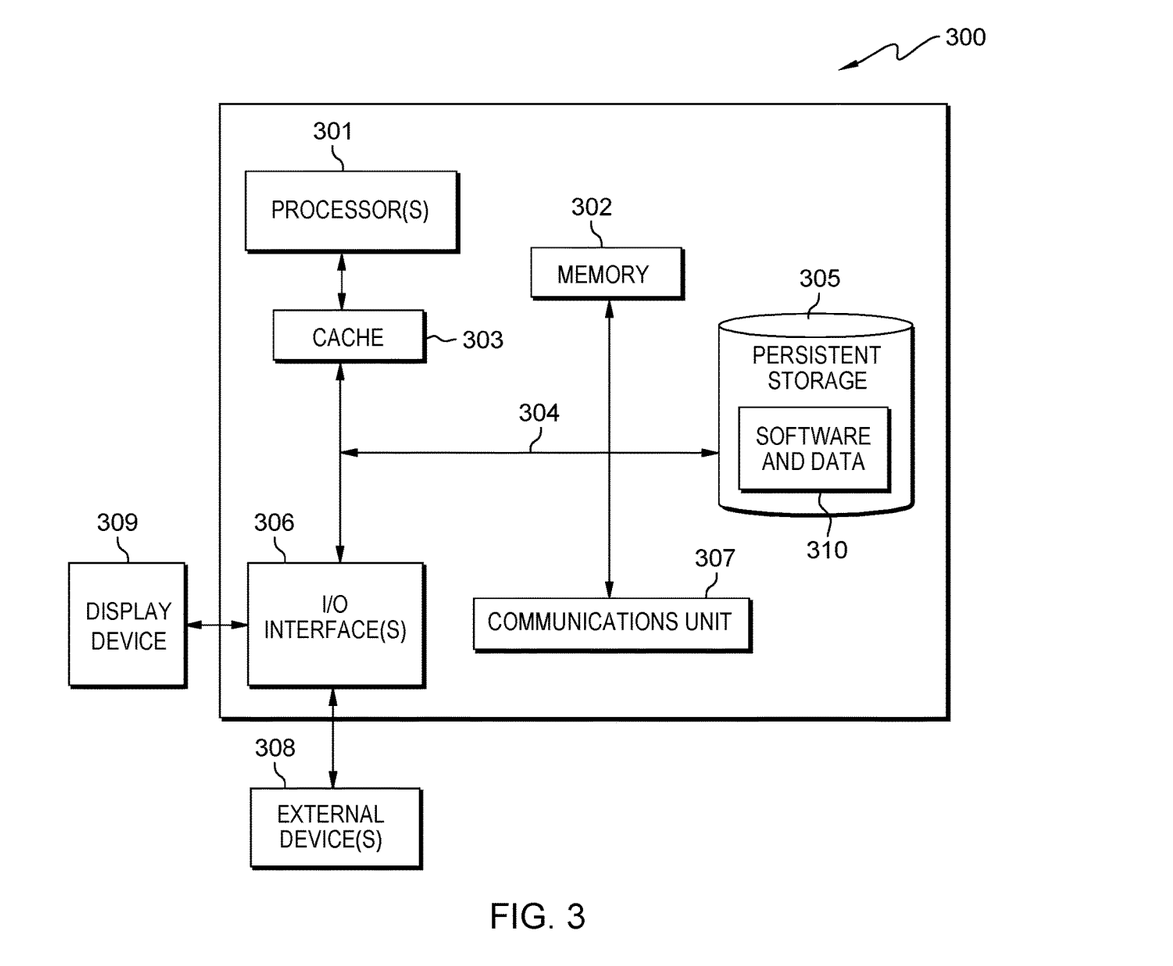
FIG. 3 depicts a block diagram of components of a computing system representative of a client device and server of FIG. 1, in accordance with embodiments of the present invention.

FIG. 3 depicts computer system 300, which is representative of client device 120 and server 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to server 130, software and data 310 includes mapping program 200 and crowdsourcing database 134.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor. Display 309 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more processors, one or more images of a location corresponding to a destination of a set of navigational instructions for a user;
   determining, by one or more processors, respective ratings for each of the identified one or more images based on crowd sourced ratings of the identified one or more images from individuals that have previously travelled to the destination;
   determining, by one or more processors, an entrance location for the destination based on the crowd sourced ratings of the identified one or more images, wherein determining the entrance location for the destination further comprises:
      determining, by one or more processors, a purpose associated with the user travelling to the destination, wherein the determined purpose is based on analyzing information associated with the user, the information selected from the group consisting of a user profile, a calendar of the user, information input by the user, and messages associated with the user; and
      determining, by one or more processors, the entrance location for the destination based on the crowd sourced ratings of the identified one or more images and the determined purpose associated with the user travelling to the destination;
   determining, by one or more processors, at least one image, of the one or more images, that depicts the determined entrance location; and
   generating, by one or more processors, directional information to the entrance location by overlaying directional information on the determined at least one image that provides an indication of the determined entrance location.

2. The method of claim 1, further comprising:
   in response to receiving input of a request for navigational instructions to the destination, accessing, by one or more processors, a database that includes images, audio, and video files that correspond to the destination.

3. The method of claim 1, further comprising:
   determining, by one or more processors, whether a camera is available within a defined proximity to a location of the user; and
   in response to determining that the camera is available, determining, by one or more processors, whether the camera is capturing images that depict the destination based on a comparison of objects captured in images of the camera to objects depicted in the identified one or more images.

4. The method of claim 1, wherein determining the entrance location for the destination based on the crowd sourced ratings of the identified one or more images and the determined purpose associated with the user travelling to the destination further comprises:
   identifying, by one or more processors, a set of images, of the identified one or more images of a location, that depict available entrances of the destination; and
   determining, by one or more processors, an image of the set of images that includes an available entrance that corresponds to the determined purpose associated with the user travelling to the destination.

5. The method of claim 1, further comprising:
   in response to determining that the user is within a defined proximity to the destination, transmitting, by one or more processors, the generated directional information to the entrance location to the user.

6. The method of claim 5, further comprising:
   requesting, by one or more processors, user feedback associated with the generated directional information; and
   storing, by one or more processors, received user feedback in a database that includes crowd sourced information.

7. A computer program product for providing improved directional information, the computer program product comprising:
   one or more computer readable hardware storage media and program instructions stored on the one or more computer readable hardware storage media, the program instructions comprising:
   program instructions to identify one or more images of a location corresponding to a destination of a set of navigational instructions for a user;
   program instructions to determine respective ratings for each of the identified one or more images based on crowd sourced ratings of the identified one or more images from individuals that have previously travelled to the destination;
   program instructions to determine an entrance location for the destination based on the crowd sourced ratings of the identified one or more images, wherein program instructions to determine the entrance location for the destination, further comprise program instructions to:
      determine a purpose associated with the user travelling to the destination, wherein the determined purpose is based on analyzing information associated with the user, the information selected from the group consisting of a user profile, a calendar of the user, information input by the user, and messages associated with the user; and determine the entrance location for the destination based on the crowd sourced ratings of the identified one or more images and the determined purpose associated with the user travelling to the destination;

program instructions to determine at least one image, of the one or more images, that depicts the determined entrance location; and program instructions to generate directional information to the entrance location by overlaying directional information on the determined at least one image that provides an indication of the determined entrance location.

8. The computer program product of claim 7, further comprising program instructions, stored on the one or more computer readable storage media, to:

responsive to receiving input of a request for navigational instructions to the destination, access a database that includes images, audio, and video files that correspond to the destination.

9. The computer program product of claim 7, further comprising program instructions, stored on the one or more computer readable storage media, to:

determine whether a camera is available within a defined proximity to a location of the user; and responsive to determining that the camera is available, determine whether the camera is capturing images that depict the destination based on a comparison of objects captured in images of the camera to objects depicted in the identified one or more images.

10. The computer program product of claim 7, wherein program instructions to determine the entrance location for the destination based on the crowd sourced ratings of the identified one or more images and the determined purpose associated with the user travelling to the destination, further comprise program instructions to:

identify a set of images, of the identified one or more images of a location, that depict available entrances of the destination; and determine an image of the set of images that includes an available entrance that corresponds to the determined purpose associated with the user travelling to the destination.

11. The computer program product of claim 7, further comprising program instructions, stored on the one or more computer readable storage media, to:

responsive to determining that the user is within a defined proximity to the destination, transmit the generated directional information to the entrance location to the user.

12. The computer program product of claim 11, further comprising program instructions, stored on the one or more computer readable storage media, to:

request user feedback associated with the generated directional information; and store received user feedback in a database that includes crowd sourced information.

13. A computer system for providing improved directional information, the computer system comprising:

one or more computer processors;

one or more computer readable hardware storage media; and program instructions stored on the computer readable hardware storage media for execution by at least one of the one or more processors, the program instructions comprising:

program instructions to identify one or more images of a location corresponding to a destination of a set of navigational instructions for a user;

program instructions to determine respective ratings for each of the identified one or more images based on crowd sourced ratings of the identified one or more images from individuals that have previously travelled to the destination;

program instructions to determine an entrance location for the destination based on the crowd sourced ratings of the identified one or more images, wherein program instructions to determine the entrance location for the destination, further comprise program instructions to:

determine a purpose associated with the user travelling to the destination, wherein the determined purpose is based on analyzing information associated with the user, the information selected from the group consisting of a user profile, a calendar of the user, information input by the user, and messages associated with the user; and determine the entrance location for the destination based on the crowd sourced ratings of the identified one or more images and the determined purpose associated with the user travelling to the destination;

program instructions to determine at least one image, of the one or more images, that depicts the determined entrance location; and program instructions to generate directional information to the entrance location by overlaying directional information on the determined at least one image that provides an indication of the determined entrance location.

14. The computer system of claim 13, further comprising program instructions, stored on the computer readable storage media for execution by at least one of the one or more processors, to:

responsive to receiving input of a request for navigational instructions to the destination, access a database that includes images, audio, and video files that correspond to the destination.

15. The computer system of claim 13, further comprising program instructions, stored on the computer readable storage media for execution by at least one of the one or more processors, to:

determine whether a camera is available within a defined proximity to a location of the user; and responsive to determining that the camera is available, determine whether the camera is capturing images that depict the destination based on a comparison of objects captured in images of the camera to objects depicted in the identified one or more images.

16. The computer system of claim 13, wherein program instructions to determine the entrance location for the destination based on the crowd sourced ratings of the identified one or more images and the determined purpose associated with the user travelling to the destination, further comprise program instructions to:

identify a set of images, of the identified one or more images of a location, that depict available entrances of the destination; and determine an image of the set of images that includes an available entrance that corresponds to the determined purpose associated with the user travelling to the destination.

17. The computer system of claim 13, further comprising program instructions, stored on the computer readable storage media for execution by at least one of the one or more processors, to:

responsive to determining that the user is within a defined proximity to the destination, transmit the generated directional information to the entrance location to the user.

* * * * *